United States Patent [19]

Schweikhardt

[11] 3,958,096
[45] May 18, 1976

[54] WELDING ARC GAP IONIZATION DEVICE

[75] Inventor: George M. Schweikhardt, Richland, Wash.

[73] Assignee: The United States of America as represented by the United States Energy Research and Development Administration, Washington, D.C.

[22] Filed: Dec. 23, 1974

[21] Appl. No.: 535,240

[52] U.S. Cl. .................................... 219/75; 219/74; 219/121 R; 250/496; 313/54
[51] Int. Cl.² .................. B23K 35/38; G21F 5/02
[58] Field of Search ........ 219/74, 75, 121 P, 121 R; 250/492, 493, 496; 313/54

[56] References Cited
UNITED STATES PATENTS

| 2,990,492 | 6/1961 | Wellinger et al. ................. 313/54 |
| 3,124,744 | 3/1964 | Zito ....................................... 313/54 |
| 3,309,564 | 3/1967 | Poulsen ........................ 219/121 P X |
| 3,633,032 | 1/1972 | Stein ................................ 250/496 X |
| 3,832,513 | 8/1974 | Klasson ................................ 219/75 |
| 3,838,242 | 9/1974 | Goucher ........................... 219/75 X |
| 3,858,125 | 12/1974 | Nelson et al. .................. 313/54 X |

Primary Examiner—Arthur T. Grimley
Assistant Examiner—N. D. Herkamp
Attorney, Agent, or Firm—Dean E. Carlson; Arthur A. Churm; Walter L. Rees

[57] ABSTRACT

An alpha emitting isotope is positioned near the tip of a TIG welding electrode so that the alpha radiation can provide an ionized path between the electrode and the workpiece.

3 Claims, 2 Drawing Figures

U.S. Patent May 18, 1976 3,958,096
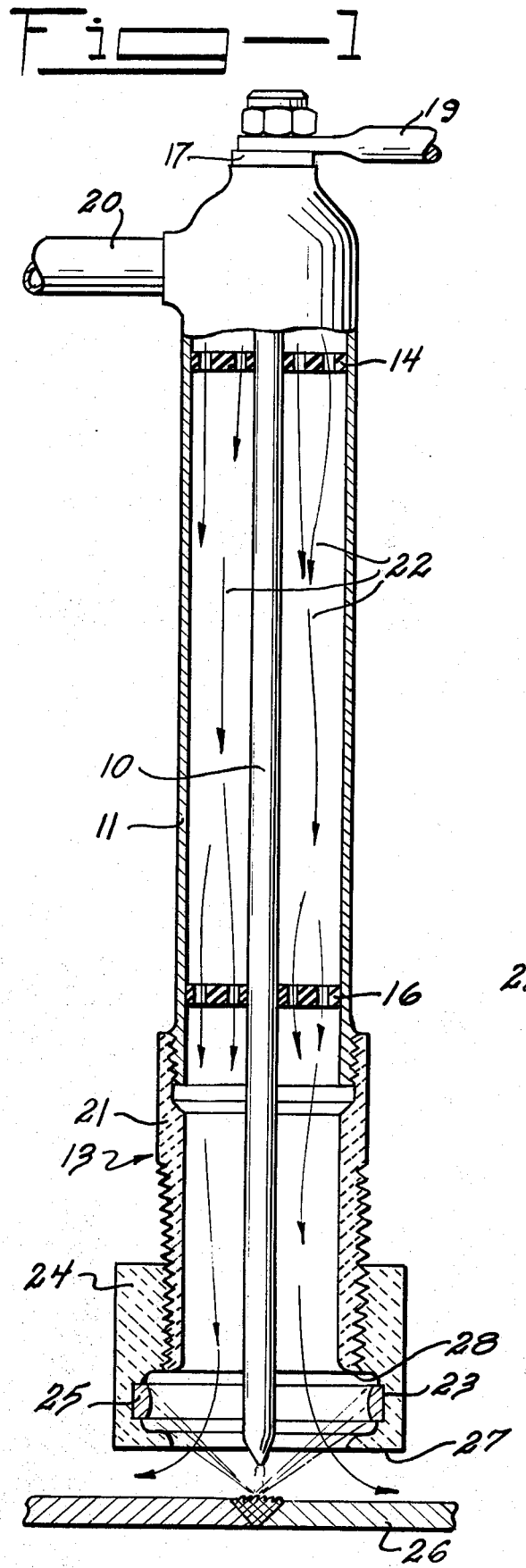
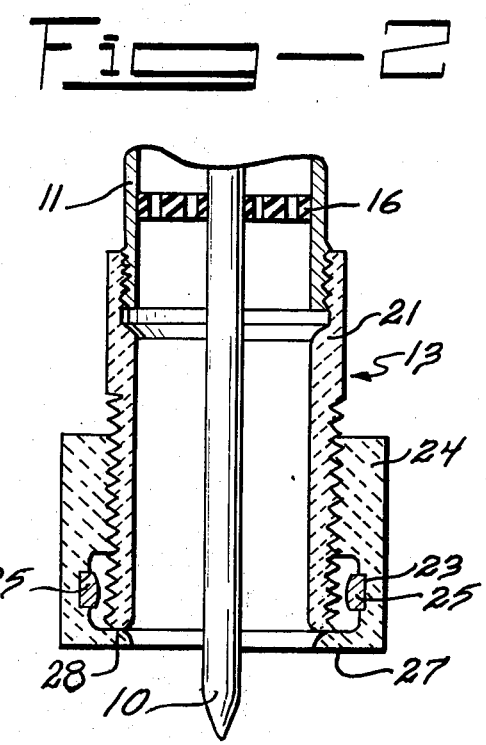

3,958,096

WELDING ARC GAP IONIZATION DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In the operation of a Tungsten Inert Gas (TIG) welder some means must be provided to initiate the arc. In some TIG welders a high power surge is provided in order to initiate ionization of the gas between the workpiece and the welder electrode. Once the arc is initiated, the power is reduced to a fixed level that will maintain the arc.

In TIG welding the distance between the workpiece and electrode is very critical to assure arc-stability. If the gap becomes too large, the arc will be extinguished. If the gap becomes too small, the arc will becomes too hot and electrode damage will result. In order to maintain the desired arc gap width for critical welding, fixtures are used to position the electrode relative to the workpiece. Fixtures can be costly and time consuming to make, particularly where only a few similar pieces are to be welded.

In other methods of TIG welding an R.F. arc is established to provide an ionized path for the welding arc. This technique requires that an R.F. supply be incorporated in the TIG welder increasing its cost. The use of an R.F. arc also requires that R.F. shielding be provided to prevent radio interference.

It is therefore an object of this invention to provide an improved means of establishing and maintaining an arc in a TIG welder.

Another object of this invention is to provide a TIG welder electrode structure which does not require an R.F. supply or other special power supply to initiate and maintain the welding arc.

SUMMARY OF THE INVENTION

In practicing this invention an alpha emitting isotope is placed inside the shroud which surrounds the welding electrode. The isotope is positioned so that the alpha radiation enters the gap between the electrode and the workpiece to provide an ionized path for the welding current. The shroud acts to shield the isotope during operation of the welder. The shroud can also be provided with a structure which completely shields the isotope when the welder is not in use.

BRIEF DESCRIPTION OF THE DRAWINGS

The invention is illustrated in the drawings of which:

FIG. 1 is a cross-sectional view of the shroud and electrode structure of a TIG welder incorporating the features of this invention; and FIG. 2 is a cross-section view of a portion of the shroud showing the isotope shielding when the welder is not in use.

DETAILED DESCRIPTION OF THE INVENTION

Referring to FIG. 1 there is shown a welding electrode holder with an electrode 10 positioned in an electrode holding structure 11, with the end of electrode 10 being encased in a shroud 13. Electrode holding structure 11 is formed of an electrical and thermal insulating material so that the operator can grasp it to control the position of the electrode. Electrode 10 is spaced away from electrode holding structure 11 by means of supports 14 and 16 which are made of electrically insulating material. An electrical feed through 17 provides a structure for connecting a power cable 19 to electrode 10. The inert gas used in welding is supplied through tube 20 and flows through electrode holding structure 11 and shroud 13 as shown by arrows 22. Power cable 19 is connected to the welding current supply (not shown) and tube 20 is connected to a supply of inert gas (not shown). The device just described is a commonly used electrode holder which is well known to those skilled in the welding art. Other similar electrode holders for TIG welding are well known and can be used in practicing this invention.

Shroud 13 consists of an upper portion 21 and a lower portion 24 and is formed of a high melting point electrically nonconductive material, such as a ceramic. Shroud 13 surrounds the lower portion of electrode 10 so as to direct the flow of inert gas over the weld area. An isotope holding structure 23 is formed on the lower portion 24 of shroud 13 and provides a place to hold the alpha emitting isotope 25 used to supply the radiation in the gap between the electrode 10 and the workpiece 26. The lower portion 24 of shroud 13, including isotope holding structure 23, can be an integral part of shroud 13 or it can be a screw on piece such as is shown in FIG. 1.

Isotope 25 is selected so that it will provide the required radiation to ionize the gap between electrode 10 and workpiece 26 with a minimum of radiation hazard. The isotope should be primarily an alpha emitter as for example $Po^{210}$, $Pt^{190}$ and $Hf^{174}$. The isotope selected should decay to a stable element so that daughter products will not be a radiation hazard.

Isotope 25 can be, for example, in the form of an annular ring inside the shroud. The alpha radiation is introduced directly into the gap between electrode 10 and workpiece 26 to ionize the gap. The shroud 13 acts to shield the operator from the alpha radiation.

In operation the electrode 10 is polarized positive with respect to the workpiece. The double positive charge of the alpha paticles provides an arc path from electrode 10 to workpiece 26. This ionized path acts to initiate and maintain a stable arc without requiring that the electrodeworkpiece distance be held to a critical dimension. By using the alpha emitting isotope to provide ionization of the arc gap, the welder power supply requirements would be lessened and R-F circuits would not be needed.

In FIG. 1 the lower portion 24 of shroud 13 is shown in a lowered position exposing isotope 25 so that alpha radiation can reach the welding area. In FIG. 2 the lower portion 24 of shroud 13 isj shown in a raised position so that lip 27 on lower shroud portion 24 butts against end 28 of upper shroud portion 21. With the lower shroud portion 24 in a raised position isotope 25 is surrounded by the material forming the shroud so that the alpha radiation is shielded. The lower shroud portion 24 is raised and lowered by means of the threads on the upper shroud portion 21 and the lower shroud portion 24.

It should be apparent that various modifications to the present invention may be made by those skilled in the art without departing from the scope of the invention. Thus, while the invention has been described in relation to improvements in TIG welding using alpha particles as an ionized welding arc path, the invention may be practiced with reversed polarity welding and beta particles. Also, it will be apparent that the present invention is equally applicable to arc welding and/or melting in space applications where there is no gas to ionize (the charged particles would then provide the arc path) or to vacuum arc melting. It is therefore understood that all matters contained in the above description are illustrative only and the present invention is to be limited only by the appended claims.

The embodiments of the invention is which an exclusive property or privilege is claimed are defined as follows:

1. In a welding electrode holder for use in TIG welding a workpiece, the welding electrode holder including an electrode holding structure, a hollow tubular shroud having one end connected to the electrode holding structure and an opposite open end, and an electrode centrally positioned in the electrode holder and shroud with the electrode having a tip extending outside of the open end of the shroud, the electrode holding structure and shroud being formed so that an inert gas applied to the electrode holder is directed out of the open end of the shroud and between the electrode tip and the workpiece, the improvement for providing an ionized welding arc path between the electrode tip and the workpiece, comprising, an isotope holding structure formed on the inside of the tubular shroud at the open end thereof, and an alpha emitting isotope positioned on said isotope holding structure so that alpha particles from said alpha emitting isotope enter the gap between the electrode tip and the workpiece and provide an alpha particle welding arc path therebetween.

2. The welding electrode holder of claim 1 wherein, said alpha emitting isotope is in the form of an annular ring positioned on said isotope holding structure and surrounding the electrode.

3. The welding electrode holder of claim 1 wherein, the shroud includes a first portion having one end attached to the electrode holding structure and an opposite end having threads on the outside thereof, the shroud further having a second portion with an inside threaded end engaging said threaded end of said first shroud portion and an opposite open end, said opposite open end having a lip extending inward and a recessed portion on the inside surface of said second shroud portion above said lip, said alpha emitting isotope being positioned within said recessed portion, said second shroud portion being movable with respect to said first shroud portion by means of said engaged threaded ends from a first position with said alpha emitting isotope exposed so that alpha particles therefrom provide said ionized welding arc path to a second position with said lip butting against said threaded end of said first shroud portion thereby forming a shielding enclosure surrounding said alpha emitting isotope.

* * * * *